(12) United States Patent
Noy et al.

(10) Patent No.: US 8,355,581 B2
(45) Date of Patent: Jan. 15, 2013

(54) SYSTEM AND METHOD FOR DETECTING THE CONTOUR OF AN OBJECT ON A MOVING CONVEYOR BELT

(75) Inventors: Noam Noy, Natanya (IL); Amit Stekel, Tel Aviv (IL)

(73) Assignee: Advanced Vision Technology (AVT) Ltd., Neve Ne'eman, Hod Hasharon (IL)

( * ) Notice: Subject to any disclaimer, the term of this patent is extended or adjusted under 35 U.S.C. 154(b) by 506 days.

(21) Appl. No.: 12/530,401

(22) PCT Filed: Mar. 6, 2008

(86) PCT No.: PCT/IL2008/000297
§ 371 (c)(1),
(2), (4) Date: Jun. 28, 2010

(87) PCT Pub. No.: WO2008/107892
PCT Pub. Date: Sep. 12, 2008

(65) Prior Publication Data
US 2010/0260378 A1    Oct. 14, 2010

Related U.S. Application Data

(60) Provisional application No. 60/905,418, filed on Mar. 6, 2007.

(51) Int. Cl.
G06K 9/00 (2006.01)
G06K 9/46 (2006.01)
G02B 5/32 (2006.01)
G01N 21/86 (2006.01)

(52) U.S. Cl. .......... 382/199; 382/103; 382/190; 359/17; 250/559.06; 250/559.36

(58) Field of Classification Search ............ 382/103, 382/199, 190, 209, 147, 143, 312; 348/70, 348/91, 126; 250/559.36, 236, 208.1, 205, 250/201.6, 237 G, 559.38, 559.06; 356/608, 356/4.01, 243.1, 3.03, 4.07; 702/153; 359/17; 358/484, 474; 600/476
See application file for complete search history.

(56) References Cited

U.S. PATENT DOCUMENTS

| 4,301,373 | A | * | 11/1981 | Sjodin | 250/559.06 |
|---|---|---|---|---|---|
| 5,065,237 | A | * | 11/1991 | Tsikos et al. | 348/91 |
| 5,726,705 | A | * | 3/1998 | Imanishi et al. | 348/92 |
| 5,917,602 | A |  | 6/1999 | Bonewitz et al. |  |
| 5,991,041 | A |  | 11/1999 | Woodworth |  |
| 6,191,850 | B1 |  | 2/2001 | Chiang |  |
| 6,348,696 | B1 |  | 2/2002 | Alt et al. |  |
| 6,373,520 | B1 |  | 4/2002 | Cadieux, Jr. et al. |  |

(Continued)

*Primary Examiner* — Sheela Chawan
(74) *Attorney, Agent, or Firm* — Merchant & Gould P.C.

(57) ABSTRACT

A system detects an object contour with an image acquisition assembly, the object moving relative to the assembly. A line detector scans the surface line by line during a scan cycle, the line being transverse to the relative motion direction. During active periods, a light source emits light synchronized with the scan cycle, allowing the line detector to acquire a first group of at least one lit scan line. A second group of unlit scan line(s) is acquired during non-emitting idle periods. The object passes between the line detector and the light source. A processor receives and analyzes acquired scan lines. For each lit scan line group and a successive second unlit scan line group, the processor identifies a token pattern with a lit segment adjoining an unlit segment. The processor searches the first and second groups for the token pattern ending or reappearing to produce an object contour.

20 Claims, 7 Drawing Sheets

U.S. PATENT DOCUMENTS 6,546,356 B1 * 4/2003 Genest ..................... 702/153
7,456,842 B2 * 11/2008 Kosolapov ................ 345/589
7,668,587 B2 * 2/2010 Benaron et al. ............ 600/476
2005/0110986 A1 * 5/2005 Nikoonahad et al. ...... 356/237.2

* cited by examiner

SYSTEM AND METHOD FOR DETECTING THE CONTOUR OF AN OBJECT ON A MOVING CONVEYOR BELT

This application is a National Stage Application of PCT/IL2008/000297, filed 6 Mar. 2008, which claims benefit of U.S. Ser. No. 60/905,418, filed 6 Mar. 2007 and which applications are incorporated herein by reference. To the extent appropriate, a claim of priority is made to each of the above disclosed applications.

FIELD OF THE DISCLOSED TECHNIQUE

The disclosed technique relates to image processing, in general, and to a system and method for detecting the contour of an object on a surface, such as a moving conveyor belt, in particular.

BACKGROUND OF THE DISCLOSED TECHNIQUE

Various types of product packages, such as cigarette packages or pharmaceutical containers, are fabricated in a multi-stage process at an assembly plant. After the raw material web has been cut into an appropriate shape, the preformed packages are transported along a conveyor belt, before the folding and bonding commences. At this stage, it is necessary to conduct an inspection of the preformed packages. The precise contour of the preformed package is determined, in order to ensure that it is properly aligned in the correct orientation on the conveyor belt. Once the preformed package is properly aligned, a comparison can be made with an optimal package template, to verify that the packages match within acceptable tolerance limits. In this manner, the presence of any errors or irregularities (i.e., extra fragments or missing sections) in the preformed package can be detected.

Current inspection systems include visual imaging elements operative for examining each individual preformed package. However, processing the images to determine the overall contour of the package is very time-consuming. Edge detection is a fundamental problem in the field of image processing. Edge detection refers to the ability to find, sufficiently accurately and quickly, the transition point between the object and the background. The ability to determine the contour of the preformed package establishes a limit on the processing speed of this stage of the fabrication process, thereby reducing the total output. In general, there is an overall tradeoff between the processing speed and the orientation accuracy.

U.S. Pat. No. 5,917,602 to Bonewitz et al, entitled "System and method for image acquisition for inspection of articles on a moving conveyor", is directed to an image acquisition system and method for inspecting a container on a moving conveyor. The conveyor transports the container from a container molding apparatus (e.g., an individual section machine), where the container is formed to the desired shape. The container continues along the conveyor until it reaches an inspection station. The image acquisition system inside the inspection station includes a line scan camera, a lighting assembly, a speed monitor (i.e., a rotary encoder), and electronic controls. The lighting assembly is positioned across the conveyor opposite the camera, defining an imaging area between them.

As the container enters the imaging area, the lighting assembly illuminates the container, while the camera generates line images of the side wall of the container. The electronic control, coupled with the inspection station, includes a computer and a monitor. The computer extracts variations in shading using visual imaging techniques, to detect production defects, contamination and damage (e.g., blisters, improper annealing, embedded foreign objects and variations in glass density) in the container. The image analysis includes edge detection routines known in the art (e.g., Sobel or Prewit algorithms), which analyze gray level changes in defined window regions for detecting the profile of the container. The computer may perform diagnostic operations to determine the cause of any detected defects, and to prescribe corrective actions to prevent further defects from occurring to the new containers. A feedback signal may be sent to the container molding apparatus, to correct the problem or to stop the molding process in order to allow further diagnosis. The rotary encoder determines the speed of the container as a function of the conveyor motion, and generates a feedback signal respective of the speed of the container. The electronic control determines the required operating speed of the camera based on this signal.

U.S. Pat. No. 5,991,041 to Woodworth entitled "Method and apparatus for measuring dimensions of objects on a conveyor", is directed to a system and method for measuring the length, width and height of an object, such as a carton, as it is transported on a conveyor. The system includes a pair of laser light sources, a pair of charge-coupled device (CCD) cameras, a digital computer, a light curtain, and a pulse tachometer. The laser light sources are disposed on opposite ends of a U-shaped frame which traverses the width of the conveyor. The cameras are mounted on opposite ends of the top bar of the frame. The computer is mounted below one of the laser light sources. The cameras are positioned such that the center of their respective coverage areas is the center of the conveyor. The tachometer is disposed on a cross member situated below the top surface of the conveyor. The light curtain includes a beam array emitter and a beam array receiver, located on either side of the conveyor. The beam array emitter includes a plurality of photo-transmitters spaced apart at fixed distances, whereas the beam array receiver includes a plurality of photo-receivers, configured to receive light from a respective photo-transmitter.

The light sources and cameras can be considered laser triangulation rangefinders. Each light source shines light toward the side of the object, along a path perpendicular to the direction of travel of the object, and at a height slightly above the surface of the conveyor. The associated CCD camera detects the reflected light from the object, and determines the distance of the object from an edge of the conveyor. The tachometer counts wheel revolutions to measure the linear distance traveled by the conveyor, and thus the distance traveled by the object. The light curtain measures the highest point of the object, based on which emitter-receiver pairs are blocked by the object as it passes through the light curtain. The computer receives data from the laser triangulation rangefinders (i.e., two side profiles of the object) and data from the light curtain (i.e., a top profile of the object). The computer determines the four edges of the object from the side profiles, and then calculates the length and width of the object. The computer calculates the height of object from the top profile. The calculations assume that the object is a rectangular solid.

U.S. Pat. No. 6,191,850 to Chiang, entitled "System and method for inspecting an object using structured illumination", is directed to a machine vision system for inspecting a surface for defects, such as during the manufacture process of "smart cards". The system includes an illumination assembly, a camera, and a computer with a display. The illumination assembly includes a fiber optic cable, and a projecting element. The fiber optic cable transmits light from a remote light source toward the projecting element along a first optical axis. The projecting element includes a pair of diffusers and a beam splitter. A grid pattern is formed on the second diffuser. The grid pattern is generally a matrix of crossing horizontal and vertical lines having uniform spacing and thickness, but may include any repeating or intersecting pattern. The light from the fiber optic cable passes through each of the diffusers to the beam splitter along the first optical axis. The beam splitter directs the light toward the surface of the object to be inspected, along a second optical axis perpendicular to the first optical axis, thereby projecting a grid image on the object surface. The light from the object surface is reflected back toward the projecting element, and then directed toward the camera via the beam splitter, along an optical axis perpendicular to the optical plane of the camera. The camera transmits data to the display for viewing, via a video processor or frame grabber.

The computer implements an analysis of the projected grid pattern to determine underlying defects on the object surface. A region of the surface to project the grid is established, and the object or system elements may be moved accordingly. The grid is located by means of a fiducial having a different appearance than the grid features. Specific features of the grid are then identified and scored, using pattern recognition. The feature scores are compared with tolerance limits, and if all feature scores are not within the tolerance limits, the surface is rejected as defective. Otherwise, the grid features are ranked by row and column, to generate a matrix of feature locations. An ideal grid is constructed based on the ranking, and the locations of the actual grid features are compared with the locations of the ideal grid features. The deviations of the actual grid features from the ideal grid features are compared with tolerance limits, and the surface is rejected as defective if the tolerance limits are exceeded. Otherwise, the surface is accepted.

U.S. Pat. No. 6,348,696 to Alt et al entitled "Method and device for detecting the position of the edge of a moving material web", is directed to a device and method for detecting the edge of a material web. The device includes a light source, a sensor unit made up of a plurality of sensors, and a microcontroller. Each sensor is a photodiode located in the bore of a plastic panel. The sensors are distributed along the panel equidistantly and transversely to the direction of movement of the material web. The light source (i.e., a fluorescent tube) emits light toward the material web, which absorbs or reflects part of the light rays, depending on the position of the edge. The light rays pass through an optical element, which absorbs all the light rays except those that extend perpendicular to the material web. The light rays then reach the sensor unit. Each sensor is coupled to an analog multiplexer and a current/voltage converter, which converts the photo-current into a proportional voltage. The output is coupled in turn to an A/D converter, which generates a digital value respective of the voltage. These values are received by the microcontroller, and stored in a storage unit.

Each sensor generates a signal that is based on the amount of the material web covered by that sensor. Accordingly, the inner sensors which are completely covered by the material web generate an idle signal, whereas the outer sensors which are not covered by the material web at all generate a maximum signal. The sensors located in the area of the edge of the material web generate signals in between the idle signal and the maximum signal. The function of the sensor signals therefore includes two constant ranges (i.e., maximum and idle), with a transition range in between. The edge of the material web is determined based on the turning point of the function of the sensor signals. The microcontroller determines the turning point by differentiating the function of the signal twice and computing a zero coefficient of the second derivate, or alternatively, by numerical differentiation and numerical searching of the maximum of the first derivative. Further alternatively, a fit function is approximated to the function of the sensor signals, and the turning point is calculated based on the fit parameters.

U.S. Pat. No. 6,373,520 to Cadieux, Jr. et al entitled "System and method for visually inspecting a cigarette packaging process", is directed to an inspection system and method for detecting and removing non-conforming cigarette packages during the fabrication process. The system includes an inspection station and an ejection station. The inspection station includes a first inspection device and a second inspection device. At a packaging machine, the cigarette packages are packed in soft or hard pack wrappers. The cigarette packages travel in single file along a conveyor path from the packaging machine to the inspection station. The packages pass through each of the inspection devices on different conveyor belts, and then toward the ejection station. The first inspection device may be a foil detection device, which determines the presence or absence of a foil wrapper on the package. The foil detection device includes a plurality of sensors (i.e., photosensor cells) which detects the presence of foil on four sides of the package. The second inspection device may be a vision inspection system, which captures images of at least one surface of the package. The vision inspection system includes three cameras, a photosensor, a light source and a controller. Each camera is oriented to view at least one different surface of the package. The photosensor detects the arrival of the package and signals the controller, which activates the light source (e.g., a group of fiberoptic bundles). The package enters a reflector housing, on which the fiberoptic bundles may be mounted. The light source provides a flash of light to illuminate the package when it is at the desired viewing position. The light is dispersed by baffles, and reflected off a flat white coating on the interior curved surface of the reflector housing. The package is thereby illuminated with a consistent and even distribution of diffused light. The cameras capture images of the respective package surfaces. The images are processed by vision inspection software, which identifies non-conforming features in the packages. The controller receives signals to identify the non-conforming packages, and instructs the ejection station to remove the non-conforming packages from the conveyor path. The ejection station includes two ejection mechanisms, such that packages exhibiting a first non-conforming feature (i.e., by the first inspection device) are deflected to a first location, and packages exhibiting a second non-conforming feature (i.e., by the second inspection device) are deflected to a second location. Each ejection mechanism includes an air jet, which is oriented to deflect the non-conforming package into a container. The controller activates a high speed air valve to operate the air jet. The ejection station may further include photocells to detect the arrival of a package and to confirm the ejection of the package through a timed sequence programming operation.

SUMMARY OF THE DISCLOSED TECHNIQUE

In accordance with the disclosed technique, there is thus provided a system for detecting the contour of an object situated on a surface. The system includes an image acquisition assembly coupled with a processor. The image acquisition assembly includes a line detector and a light source. The object passes between the line detector and the light source by virtue of relative motion between the image acquisition assembly and the object. The line detector scans the surface line by line, by virtue of the relative motion. Each line is scanned during a scan cycle, and is transverse to the direction of the relative motion. The light source emits light toward the line detector during active periods between idle periods. During each of the active periods, light is emitted for at least one cycle synchronized with a scan cycle, allowing the line detector to acquire a first group of at least one lit scan line. During each of the idle periods, lasting for at least another cycle synchronized with a scan cycle, no light is emitted, allowing the line detector to acquire a second group of at least one unlit scan line. The processor receives and analyzes scan lines acquired by the line detector. For each of a first group of at least one lit scan line and a successive second group of at least one unlit scan line, the processor identifies a token pattern consisting of a lit segment of the first group adjoining an unlit segment of the second group. The processor searches along the first group and the successive second group for the location where the token pattern ends or reappears, thereby defining edges of the object. The processor combines the collection of the defined edges to produce an overall contour of the object.

In accordance with another aspect of the disclosed technique, there is also provided a method for detecting the contour of an object situated on a surface. The method includes the procedure of emitting light from a light source toward a scanning means, during active periods between idle periods. The object passes between the scanning means and the light source by virtue of relative motion between the object and the scanning means. The method further includes the procedure of scanning the surface line by line by the scanning means, by virtue of the relative motion. Each line is scanned during a scan cycle, allowing the scanning means to acquire a first group of at least one lit scan line during each of the active periods, and a second group of at least one unlit scan line during each of the idle periods. During each of the active periods, light is emitted for at least one cycle synchronized with a scan cycle. During each of the idle periods lasting for at least another cycle synchronized with a scan cycle, no light is emitted. The method further includes the procedure of, for each of a first group of at least one lit scan line and a successive second group of at least one unlit scan line, identifying a token pattern consisting of a lit segment of the first group adjoining an unlit segment of the second group. The method further includes the procedure of, for each of the first group and the successive second group, searching along the first group and the successive second group for the location where the token pattern ends or reappears, thereby defining edges of the object. The method further includes the procedure of combining the collection of defined edges to produce an overall contour of the object.

In accordance with a further aspect of the disclosed technique there is thus provide a method for detecting the contour of a moving object. The method includes the procedures of determining a background pattern, emitting a light pattern respective of at least a portion of the determined background pattern and acquiring an image of said object moving over the emitted light. The method further includes the procedure of identifying a token pattern, in the acquired image, searching for locations in said acquired image where said token pattern disappears or reappears, thereby defining edges of said object and combining the collection of the defined edges to produce an overall contour of said object. The background pattern exhibits at least one bright section and at least one dark section. Each of the at least one bright section is adjacent to one of the at least one dark section. The token pattern is identified according to the determined background pattern. The token pattern includes at least one bright segment and at least one dark segment.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by providing a system and method with a unique edge detection technique when detecting the contour of an object situated on a surface. The disclosed technique establishes a background pattern of lit scan lines alternating with unlit scan lines, allowing quick and accurate determination of the intersection or border between the background and the object. A light source emits light toward a line detector. The object passes between the light source and the line detector, by virtue of relative motion between the object and the line detector. For example, the object is situated on a moving surface, such as a conveyor belt. The light source emits light during active periods, in between idle periods during which no light is emitted. The line detector scans the surface line by line, where each line is scanned during a scan cycle. The line detector acquires a first group of at least one lit scan line during each of the active periods, and a second group of at least one unlit scan line during each of the idle periods. A processor receives the scan lines. For each of a first group of at least one lit scan line and a successive second group of at least one unlit scan line, the processor identifies a token pattern consisting of a lit segment of the first group adjoining an unlit segment of the second group. The processor searches along the first group and the successive second group for the location where the token pattern ends or reappears, and defines edges of the object at that location. The processor combines the collection of defined edges, to produce an overall contour of the object.

Figure 1:
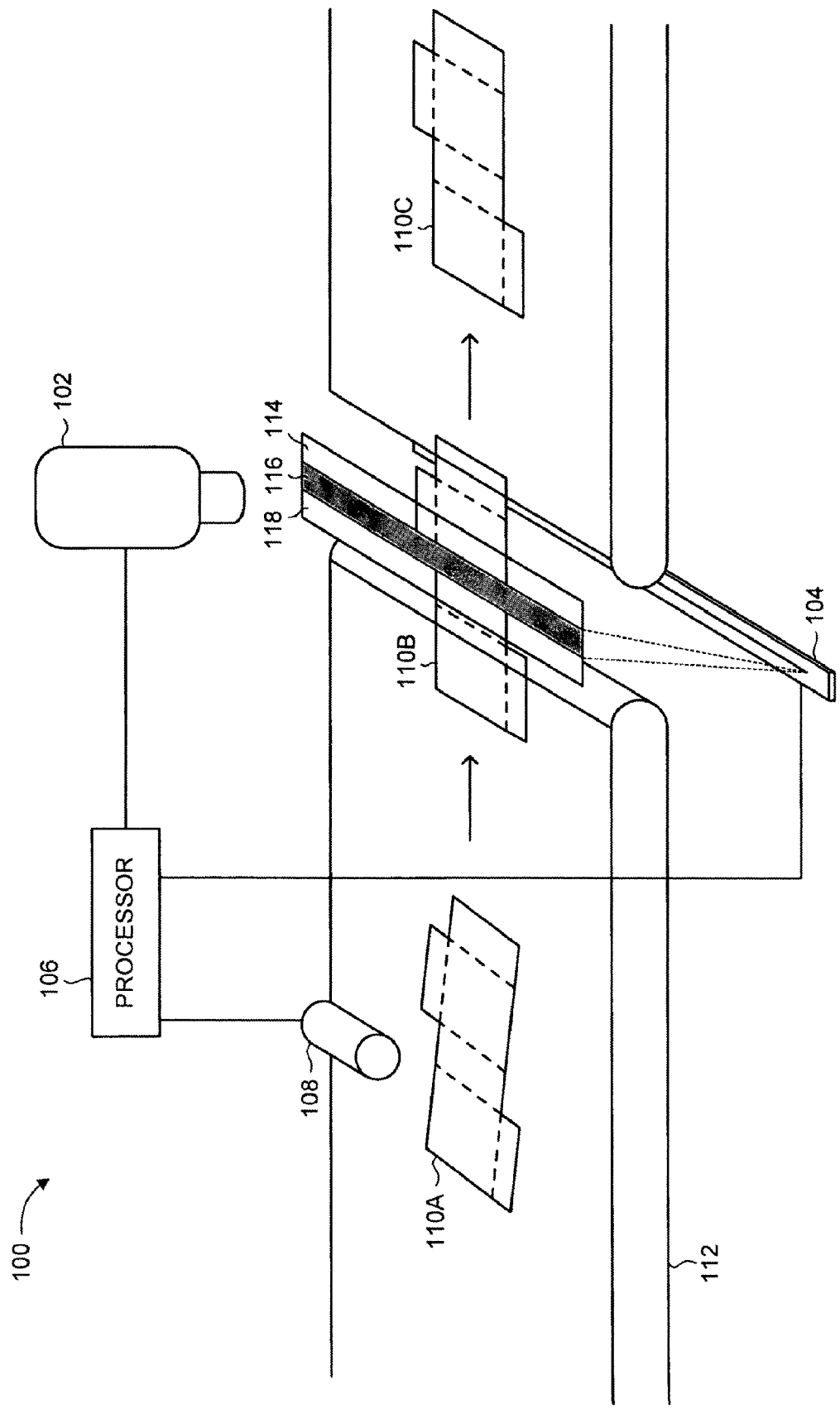
FIG. 1 is a schematic illustration of a system for detecting the contour of an object situated on a moving conveyor belt, constructed and operative in accordance with an embodiment of the disclosed technique.

Reference is now made to FIG. 1, which is a schematic illustration of a system, generally referenced 100, for detecting the contour of an object situated on a moving conveyor belt, constructed and operative in accordance with an embodiment of the disclosed technique. System 100 includes a line detector 102, a light source 104, a processor 106, and a linear speed monitor 108. Processor 106 is coupled with line detector 102, with light source 104 and with linear speed monitor 108.

Line detector 102 may be any image acquisition device capable of scanning the surface line by line. For example, line detector 102 may be a line scan camera. Light source 104 may be any type of light source capable of projecting a strip of light toward the surface in an alternating manner. For example, light source 104 may be an array of light emitting diodes (LEDs). Line detector 102 and light source 104 together make up an image acquisition assembly.

Preformed packages 110A, 110B and 110C are transported along a conveyor belt 112. Preformed packages 110A, 110B and 110C are spaced apart relative to one another. The disclosed technique is applicable to determining the contour of any object that will assume a defined shape at a future point in time, such as a preformed package in the intermediate stage of the fabrication process. In the embodiment of FIG. 1, each of preformed packages 110A, 110B and 110C is a flat two-dimensional object, such as a package or container made of paper or a similar flexible material, before it has been folded (e.g., a cigarette package).

Conveyor belt 112 is divided into two separate sections by a gap. In the embodiment of FIG. 1, light source 104 is situated substantially below the gap, while line detector 102 is situated substantially above the gap, in alignment with line detector 102. Alternatively, line detector 102 is situated substantially below the gap, while light source 104 is situated substantially above the gap, in alignment with line detector 102. In general, the light projected by light source 104 is directed toward line detector 102, with the object passing between light source 104 and line detector 102. The width of the gap is generally large enough to accommodate a single object pixel of light source 104, such that light source 104 projects a strip of light as wide as a single pixel toward the gap. Preformed packages 110A, 110B and 110C can pass from one section of conveyor belt 112 to the other section without falling through the gap. In another embodiment of the disclosed technique, the object is situated on a substantially transparent surface (e.g., a transparent conveyor belt), rather than a surface having a gap. Accordingly, line detector 102 is situated above any region of the transparent surface, and light source 104 is situated below the surface, in alignment with line detector 102.

Light source 104 alternately projects light toward line detector 102, through the gap in conveyor belt 112. The period during which light source 104 emits light is referred to as an "active period", while the period during which light source 104 does not emit light is referred to as an "idle period". Each active period is followed by an idle period, which in turn is followed by another active period, and so forth.

Line detector 102 acquires a series of scan lines of the gap in conveyor belt 112, by virtue of the motion of conveyor belt 112 relative to the stationary line detector 102. The period during which line detector 102 acquires a single scan line is referred to as a "scan cycle". During an active period, light source 104 emits light for at least one cycle that is synchronized with the scan cycle of line detector 102. For example, light source 104 emits light for the entire duration of an active period, which matches the entire duration of a scan cycle of line detector 102. During an idle period, light source 104 does not emit light. The idle period lasts for at least another cycle that is synchronized with the scan cycle of line detector 102. For example, light source 104 emits no light for the entire duration of an idle period, which matches the entire duration of another scan cycle of line detector 102. Processor 106 may set and adjust the timing and duration of the scan cycles of line detector 102, and also set and adjust the timing and duration of the active periods and idle periods of light source 104.

Linear speed monitor 108 measures the speed at which conveyor belt 112 operates, and hence the speed at which preformed packages 110A, 110B and 110C advance. For example, linear speed monitor 108 is a tachometer which counts the number of revolutions of a rotational member attached to conveyor belt 112. Alternatively, linear speed monitor 108 counts fixed reference marks on conveyor belt 112, which are spaced apart at known distances. Linear speed monitor 108 may also be a non-physical speed monitoring device, such as an optical based device, a magnetic based device, and the like. Linear speed monitor 108 transmits the measured speed information to processor 106. Processor 106 may then adjust the active periods of light source 104, and the scan cycles of line detector 102, accordingly.

As preformed package 110B passes over the gap in conveyor belt 112, line detector 102 acquires scan lines of successive regions of preformed package 110B. Each scan line acquired by line detector 102 is transverse to the direction of motion of conveyor belt 112. Since the scan cycles are synchronized with the emission of light by light source 104, each scan line is acquired during either an active period or an idle period. For example, scan line 114 is acquired during an active period, scan line 116 is acquired during the subsequent idle period, and scan line 118 is acquired during the subsequent active period.

Figure 2:
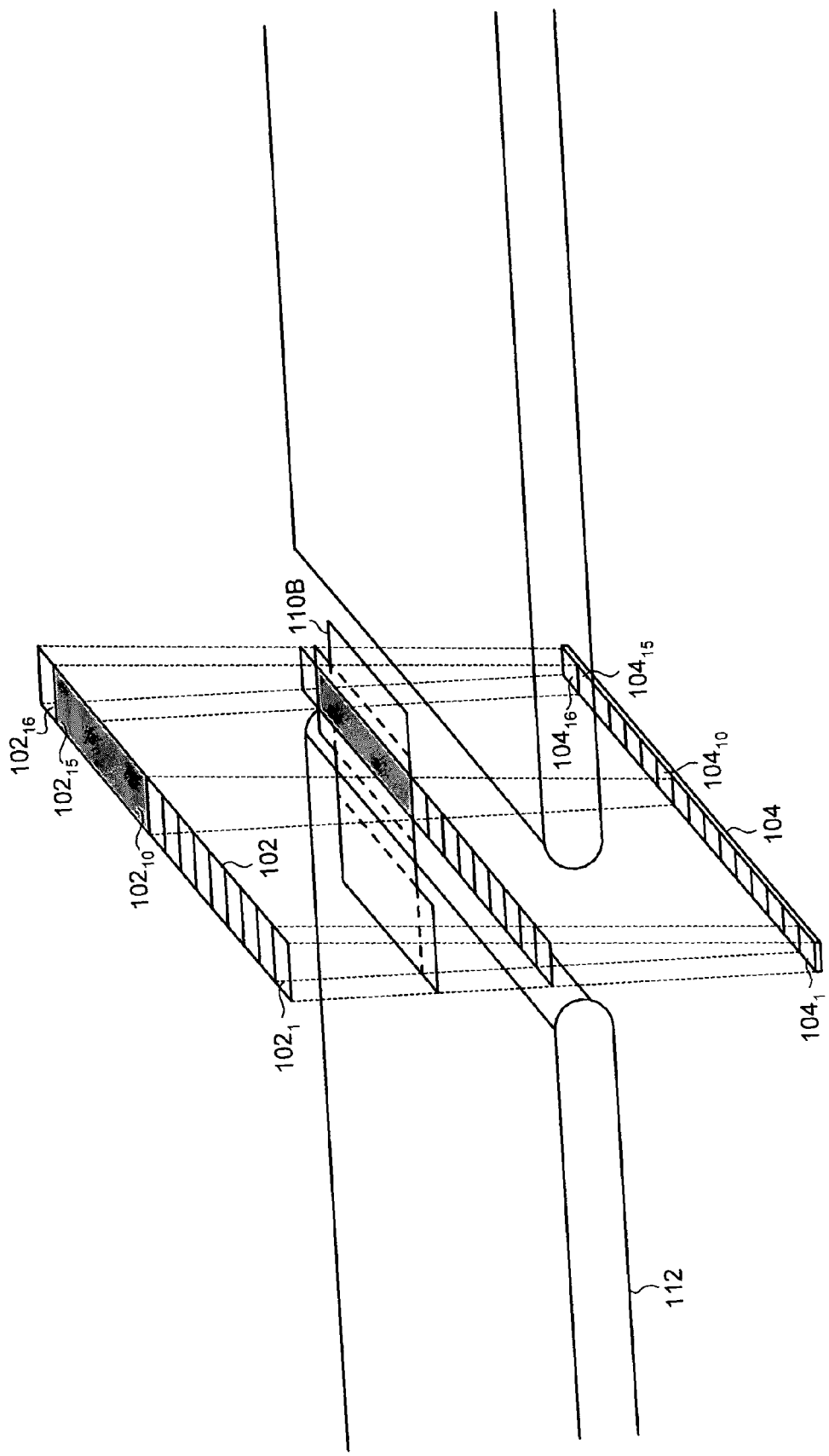
FIG. 2 is a schematic illustration of a perspective view of the image acquisition assembly of FIG. 1.

Reference is now made to FIG. 2, which is a schematic illustration of a perspective view of the image acquisition assembly of FIG. 1. In the embodiment of FIG. 2, line detector 102 is a charge-coupled device (CCD) array, and light source 104 is an array of LEDs. The light projected by the object pixels of light source 104 is detected by pixels of line detector 102.

As preformed package 110B passes over the gap, line detector 102 acquires a scan line of a slice of preformed package 110B covering the gap at that instant. At the time fragment depicted in FIG. 2, the range of pixels between pixel $102_{10}$ to pixel $102_{15}$ corresponds to the area covered by preformed package 110B. When light source 104 emits light (i.e., during an active period), line detector 102 acquires a first group of at least one lit scan line. During the next cycle of light source 104, when no light is emitted (i.e., during an idle period), line detector 102 acquires a second group of at least one unlit scan line. During an idle period, line detector 102 is unable to acquire a coherent image, since there is no background light. However, during an active period, line detector 102 is able to acquire an image. Processor 106 receives the scan lines acquired by line detector 102.

Figure 3:
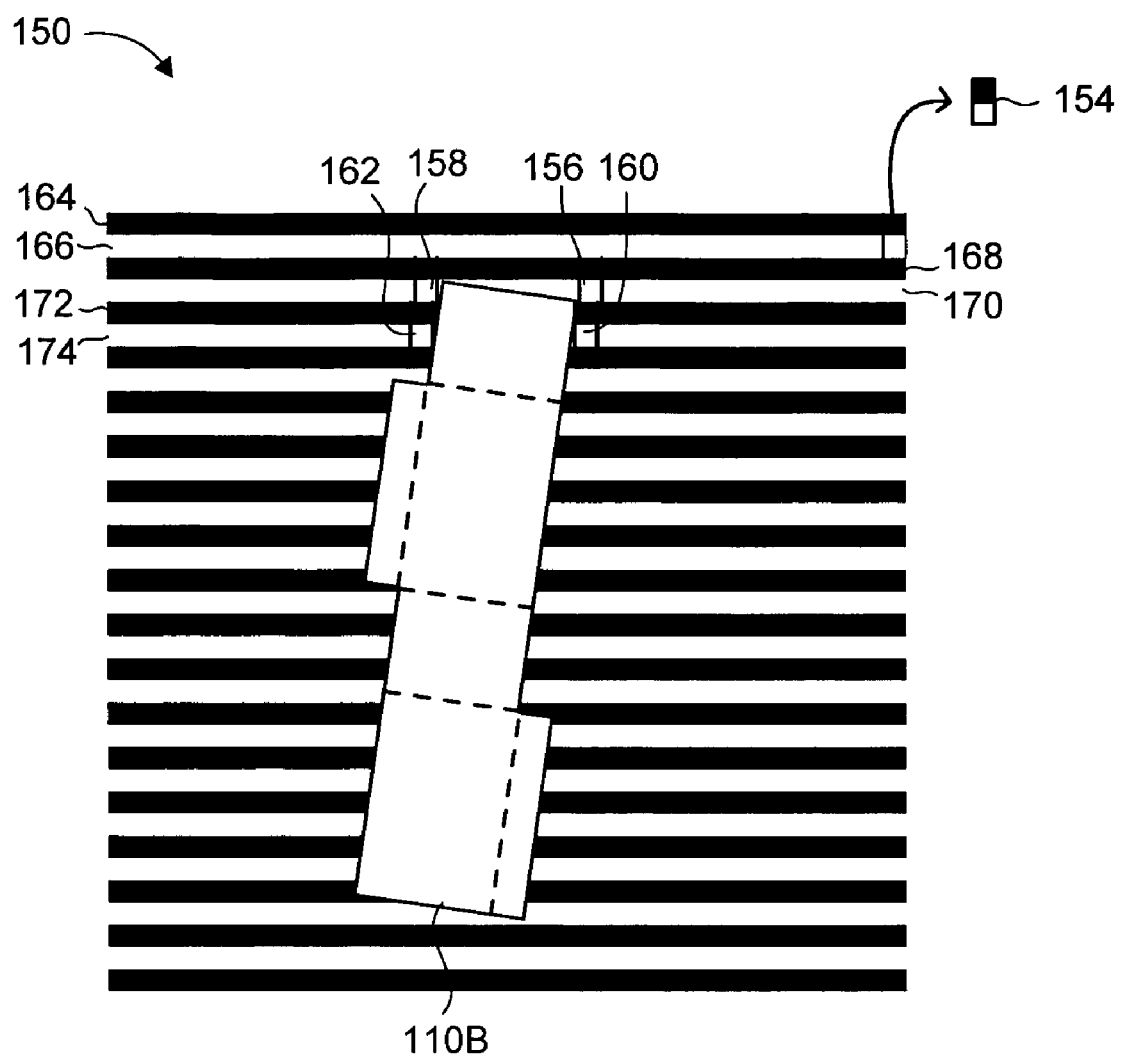
FIG. 3 is a schematic illustration of an image acquired by the system of FIG. 1.

Reference is now made to FIG. 3, which is a schematic illustration of an image, generally referenced 150, acquired by the system of FIG. 1. Image 150 includes a representation of preformed package 110B embedded within a pattern of alternating lit scan lines and unlit scan lines. The height of each scan line is equal to a single pixel of line detector 102 (FIG. 1), while the length of each scan line equals the number of pixels in the CCD array of line detector 102. In the embodiment of FIG. 3, line detector 102 acquires a single scan line during each active period, and acquires a single scan line during each idle period.

Processor 106 (FIG. 1) proceeds to analyze image 150 to determine the contour of preformed package 110B. Processor 106 identifies a "token pattern", referenced 154, in image 150. A token pattern consists of a lit segment (i.e., at least one pixel) of a group of (i.e., at least one) lit scan lines adjoining (i.e. above or below) an unlit segment of a group of unlit scan lines. In the embodiment of FIG. 3, token pattern 154 includes an unlit pixel of a first unlit scan line, adjoining a lit pixel of the lit scan line directly following the first unlit scan line.

Processor 106 identifies token pattern 154 in a lit scan line and the successive unlit scan line of image 150. Processor 106 searches along the pair of scan lines for the location where token pattern 154 ends. For example, processor 106 may identify token pattern 154 in the upper-right hand corner of image 150, and begin searching from right to left along the first pair of scan lines 164 and 166 in image 150. It is appreciated that the image processing may begin at a different starting point, such as the upper-left hand corner or the bottom-right hand corner, and may proceed in a different direction, such as from left to right, and may involve initial realignment of the scan lines to be substantially parallel. It is further appreciated that two token patterns may be used each starting at a different end scan lines 164 and 166 and scanning one toward the other. Additionally, a plurality of token patterns may be used to scan of the scan line pairs in parallel.

If token pattern 154 continues along the entire length of the pair of scan lines, processor 106 begins searching along the subsequent pair of scan lines for the location where token pattern 154 ends. For example, processor 106 searches along unlit scan line 164 and the successive lit scan line 166 in image 150 for the location where token pattern 154 ends. Processor 106 determines that token pattern 154 continues along the entire length of scan lines 164 and 166. Processor 106 begins searching along unlit scan line 168 and the successive lit scan line 170 for the location where token pattern 154 ends. Processor 106 establishes that token pattern 154 ends at location 156 along scan lines 168 and 170. Processor 106 defines a first edge of preformed package 110B at location 156.

Processor 106 continues to search along scan lines 168 and 170 from location 156 in the same direction as previously, for the location where token pattern 154 reappears. Processor 106 establishes that token pattern 154 reappears at location 158 along scan lines 168 and 170. Processor 106 defines another edge of preformed package 110B at location 158. Processor 106 continues searching along scan lines 168 and 170 from location 158 for the location where token pattern 154 ends once again. Processor 106 determines that token pattern 154 continues along the remaining length of scan lines 168 and 170.

Processor 106 proceeds to search from the beginning of the next pair of scan lines 172 and 174, for the location where token pattern 154 ends. Processor 106 establishes that token pattern 154 ends at location 160 along scan lines 172 and 174. Processor 106 defines an additional edge of preformed package 110B at location 160. Processor 106 continues to search along scan lines 172 and 174 from location 160 in the same direction as previously, for the location where token pattern 154 reappears. Processor 106 establishes that token pattern 154 reappears at location 162 along scan lines 172 and 174. Processor 106 defines a further edge of preformed package 110B at location 162. Processor 106 continues searching and determines that token pattern 154 continues along the remaining length of scan lines 172 and 174.

Processor 106 continues searching in the aforementioned manner along each pair of scan lines in image 150. Once processor 106 encounters another pair of scan lines where the token pattern continues along the entire length of the scan lines, processor 106 combines the collection of defined edges, to produce an overall contour of preformed package 110B.

Referring back to FIG. 1, it is noted that preformed package 110A is slightly misaligned on conveyor belt 112 relative to preformed packages 110B and 10C. Once the contour of the preformed package is known, either the preformed package itself, or the image of the preformed package may be rotated to the proper orientation, by selecting a number of fixed points and using techniques known in the art.

It is noted that the alternating series of lit scan lines and unlit scan lines in image 150 creates a background that is more clearly distinguishable from the object representation, than a different background that is consistent throughout (i.e., entirely lit or entirely unlit). If for instance, edge detection is performed on an image having a background that is entirely unlit, then the image processing would encounter difficulty in distinguishing the intersection between the background and a dark object (i.e., there would be similar dark pixels at the edge between the object and the background). Similarly, if for instance, edge detection is performed on an image having a background that is entirely lit, then the image processing would encounter difficulty in distinguishing the intersection between the background and a light object (i.e., there would be similar light pixels at the edge between the object and the background). However, by establishing a background containing a pattern that is both lit and unlit, it is possible to quickly and accurately determine the intersection between the background and any kind of object, using the aforementioned image processing technique of searching for a token pattern.

It is appreciated that the disclosed technique enables the assembly line process to be sped up significantly. Otherwise, it is necessary for the preformed package to be oriented extremely accurately on the conveyor belt, highly constraining the total output of the fabrication process.

According to another embodiment of the disclosed technique, line detector 102 acquires multiple scan lines during each active period, and acquires multiple scan lines during each idle period. Accordingly, the token pattern of the corresponding image includes a plurality of bright pixels (i.e., a bright segment) of a plurality of bright scan lines adjoining a plurality of dark pixels (i.e., a dark segment) of a plurality of dark scan lines. It is noted that, the term "dark" refers hereinabove to a low illumination level (i.e., there may be no illumination at all). The term "bright" refers hereinabove to an illumination level which is substantially higher then the low illumination level, such that the illumination levels of a bright pixel and of a dark pixel are distinguishable. It is further noted that the illumination level may be controlled physically (i.e., either at the light source or at the sensor). For example, placing a polarizer between the light source and the sensor and changing the polarization of the emitted light, such that a bright pixel is achieved when the light polarization is alighted with polarizer and a dark pixel is achieved when they are not aligned.

In general, when the line detector acquires multiple scan lines during each active and idle periods the size of the segments of the token pattern is determined to satisfy two conditions. According to the first condition, the size of the segment is determined to be large enough to reduce interferences. For example, in the case where the token pattern consists of a single bright pixel and a single dark pixel, a single pixel in the image, corrupted by noise, may cause the processor to miss-detect the contour (i.e., the processor may wrongly determine the edge of the object). According to the second condition, the size of the segment is determined to be small enough to maintain the desired resolution of the detected contour.

Figure 4:
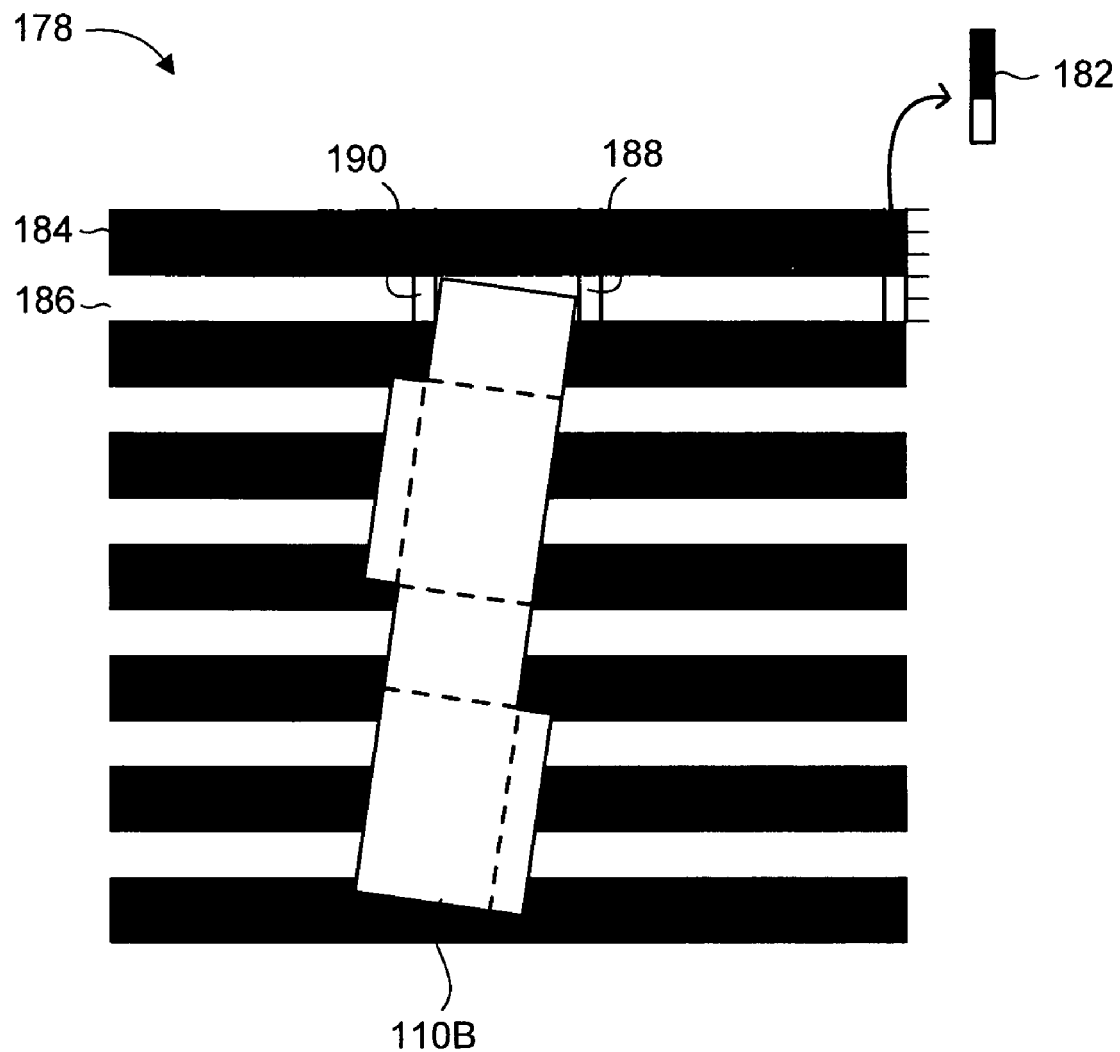
FIG. 4 is a schematic illustration of another image acquired by the system of FIG. 1.

Reference is now made to FIG. 4, which is a schematic illustration of another image, generally referenced 178, acquired by the system of FIG. 1. In the embodiment of FIG.

4, line detector 102 (FIG. 1) acquires two scan lines during each active period, and acquires three scan lines during each idle period.

Image 178 includes a representation of preformed package 110B embedded within a pattern of a group of lit scan lines alternating with a group of unlit scan lines. The group of lit scan lines includes two lit scan lines, while the group of unlit scan lines includes three unlit scan lines.

Processor 106 (FIG. 1) identifies a token pattern, referenced 182, in image 178. Token pattern 182 includes an unlit segment of three unlit pixels of a first group of three unlit scan lines, adjoining a lit segment of two lit pixels of the successive group of two lit scan lines directly following the first group of unlit scan lines.

The analysis of image 178 proceeds analogously to the analysis of image 150 of FIG. 3, but the searching proceeds along a pair of lit and unlit scan line groups, rather than a pair of lit and unlit scan lines. Processor 106 searches along unlit scan line group 184 and the successive lit scan line group 186 for the location where token pattern 182 ends. Processor 106 establishes that token pattern 182 ends at location 188 along scan line groups 184 and 186. Processor 106 defines a first edge of preformed package 1106 at location 188.

Processor 106 continues to search along scan line groups 184 and 186 from location 188 in the same direction as previously, for the location where token pattern 182 reappears. Processor 106 establishes that token pattern 182 reappears at location 190 along scan line groups 184 and 186. Processor 106 defines another edge of preformed package 110B at location 190. Processor 106 continues searching along scan line groups 184 and 186 and determines that token pattern 182 continues along the remaining length of scan line groups 184 and 186.

Processor 106 continues searching in the aforementioned manner along each subsequent pair of scan line groups in image 178. Once processor 106 encounters another pair of scan line groups where the token pattern continues along the entire length of the scan line groups, processor 106 combines the collection of defined edges, to produce an overall contour of preformed package 110B.

According to a further embodiment of the disclosed technique, line detector 102 and light source 104 are shaped in a non-straight configuration. For example, the shape of line detector 102 and light source 104 may be: curved, rounded, arched, wavy, and the like. The shape of line detector 102 must sufficiently match the shape of light source 104. The resultant pattern of scan lines on the acquired image will appear in the corresponding shape. Alternatively, line detector 102 may have a straight shape, but scans the surface in a non-straight pattern. For example, line detector 102 may scan the surface in a circular pattern, and the analysis of the scan lines would proceed from a center point in the circle outwards.

According to another embodiment of the disclosed technique, the light projected by each object pixel of light source 104 is projected toward a respective pixel in line detector 102 (e.g., each object pixel of light source 104 is a laser exhibiting directionality). Referring back to FIG. 2, pixel $102_1$ of line detector 102 detects the area projected by object pixel $104_1$ of light source 104, pixel $102_{16}$ of line detector 102 detects the area projected by object pixel $104_{16}$ of light source 104, and so forth. Thus, the pattern of the background may be created by lighting appropriate object pixels of light source 104 at each scan line. For example, the background may exhibit the pattern of a chess board (i.e., a checkered pattern). Thus, object pixels $104_1$-$104_{16}$ are alternately lit and unlit during a scan line. Object pixel $104_1$-$104_{16}$ are alternately unlit and unlit during the next scan line.

Alternatively, the background may exhibit the pattern of diagonal lines or criss-crossed lines. In general the background pattern may be determined to exhibit a pattern that is substantially different from the general pattern printed on the moving objects (e.g., the direction of the uo majority of the lines of the printed pattern). Additionally, the wavelength of the light emitted by light source 104 may be selected to be substantially different to the general wavelength of the pattern printed on the moving object (e.g., the average wavelength of the printed pattern). It is noted that the token pattern is selected to match the determined pattern and color of the background pattern.

According to yet another embodiment of the disclosed technique, conveyor belt 112 is stationary, or more generally, preformed packages 110A, 110B and 110C are situated on a stationary surface, and there is relative motion between the image acquisition assembly (i.e., line detector 102 and light source 104) and the surface. For example, preformed packages 110A, 110B and 110C are stationary, while line detector 102 and light source 104 advance at a fixed speed. Line detector 102 and line source 104 are aligned with one another, and move in the same direction at the same speed. Line detector 102 proceeds to acquire a series of scan lines of successive segments of the preformed packages. Alternatively, the preformed packages are in motion (e.g., situated on a moving conveyor belt) in one direction, while the image acquisition assembly is in motion in the opposite direction.

According to yet a further embodiment of the disclosed technique, a system for detecting the contour of an object situated on a surface includes a plurality of image acquisition assemblies. Each image acquisition assembly, made up of a line detector and a complementary light source, acquires scan lines of different segments of the object.

Figure 5:
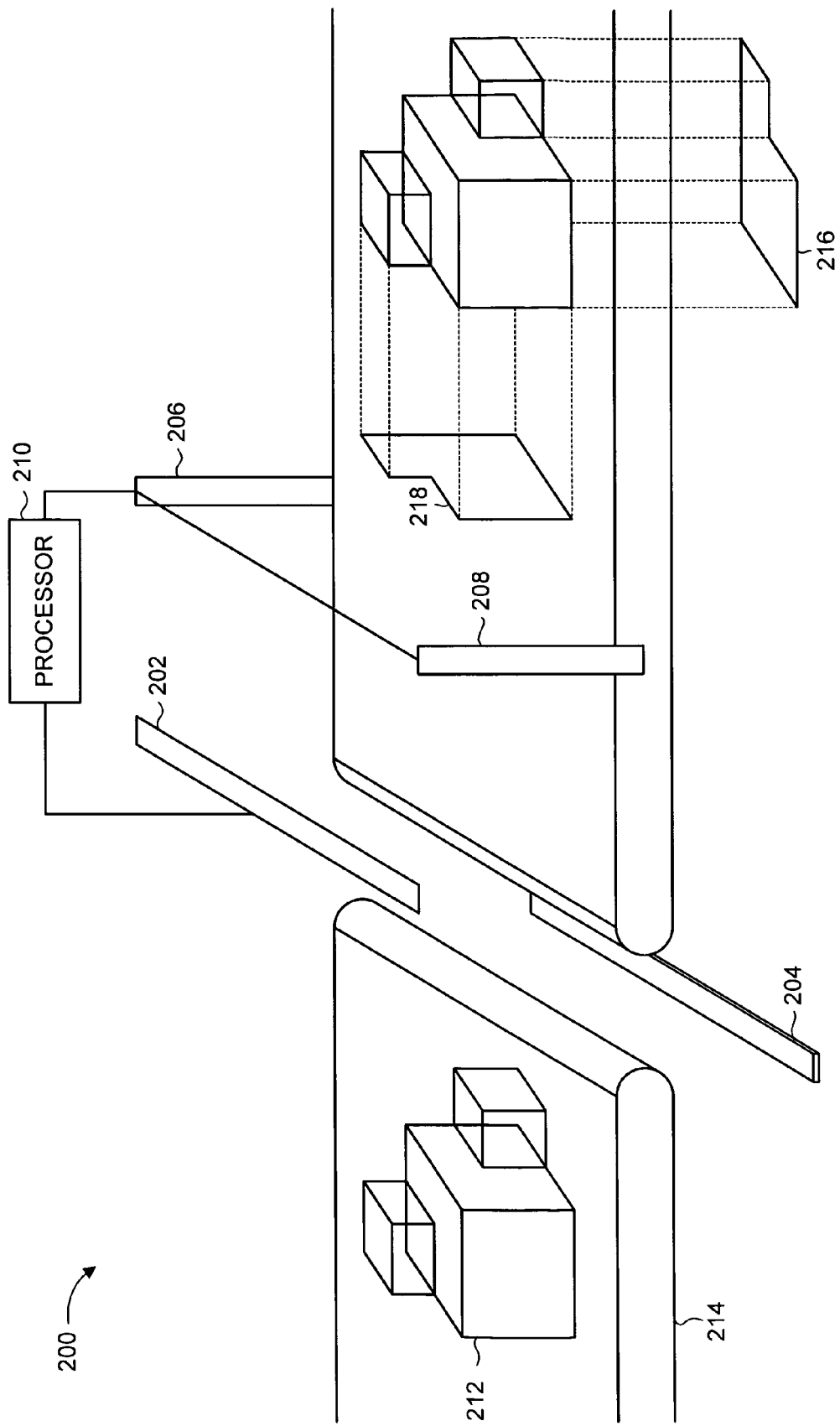
FIG. 5 is a schematic illustration of a system for detecting the contour of the two-dimensional projection of a three-dimensional object, constructed and operative in accordance with another embodiment of the disclosed technique.

According to yet another embodiment of the disclosed technique, the system determines the contour of the projection of a three-dimensional object. Reference is now made to FIG. 5, which is a schematic illustration of a system, generally referenced 200, for detecting the contour of the two-dimensional projection of a three-dimensional object, constructed and operative in accordance with another embodiment of the disclosed technique. System 200 includes a first line detector 202, a first light source 204, a second line detector 206, a second light source 208 and a processor 210. Processor 210 is coupled with first line detector 202, with first light source 204, with second line detector 206, and with second light source 208. First line detector 202 and first light source 204 make up a first image acquisition assembly. Second line detector 206 and second light source 208 make up a second image acquisition assembly.

Three-dimensional object 212 is transported along conveyor belt 214. First line detector 202 is situated substantially above the gap in conveyor belt 214, while first light source 204 is situated substantially below the gap in alignment with first line detector 202. Second line detector 206 is situated on one side of conveyor belt 214, while second light source 208 is situated on the opposite side of conveyor belt 214, in alignment with second line detector 206.

First light source 204 and second light source 208 each project light in an alternating manner. The active periods and idle periods of first light source 204 may be different from the active periods and idle periods of second light source 208. However, the scan cycles of first line detector 202 must be synchronized with each active period and each idle period of first light source 204. Similarly, the scan cycles of second line detector 206 must be synchronized with each active period and each idle period of second light source 208. Processor 210 may set and adjust the timing and duration of the respective scan cycles of first line detector 202 and second line detector 206, and the respective active periods and idle periods of first light source 204 and second light source 208.

As object 212 passes by the first image acquisition assembly, first line detector 202 acquires a series of scan lines representing the two-dimensional projection, referenced 216, of object 212 in a plane that is parallel to the imaging surface of line detector 202. Object 212 continues to advance along conveyor belt 214. As object 212 passes the second image acquisition assembly, second line detector 206 acquires a series of scan lines representing the two-dimensional projection, referenced 218, of object 212 in a plane that is parallel to the imaging surface of line detector 206. Processor 210 analyzes each set of scan lines independently to determine the precise contour of projection 216 and of projection 218, in an analogous manner as described herein above.

Figure 6:
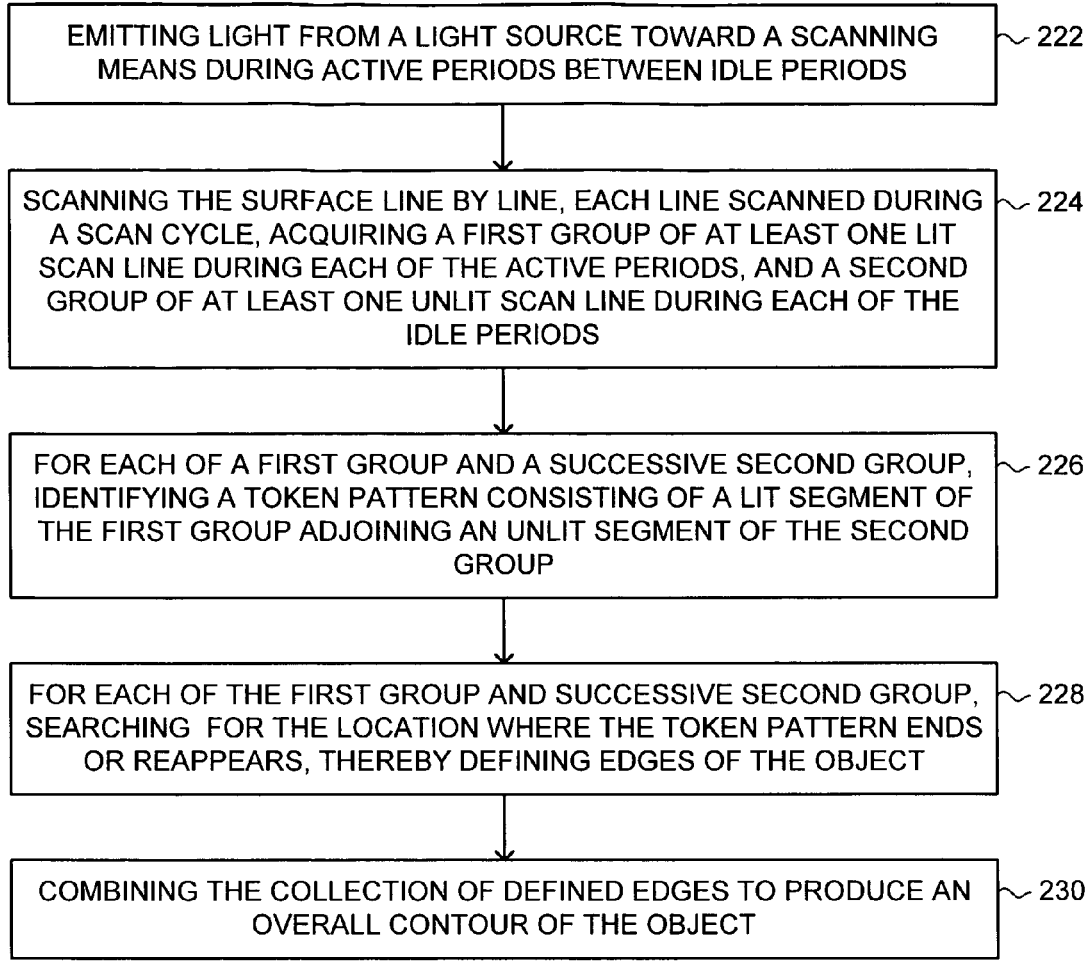
FIG. 6 is a schematic illustration of a method for detecting the contour of an object situated on a moving conveyor belt, operative in accordance with a further embodiment of the disclosed technique.

Reference is now made to FIG. 6, which is a schematic illustration of a method for detecting the contour of an object situated on a moving conveyor belt, operative in accordance with a further embodiment of the disclosed technique. In procedure 222, light is emitted from a light source toward a scanning means during active periods between idle periods. With reference to FIG. 1, light source 104 alternately projects light toward line detector 102, through the gap in conveyor belt 112. Light source 104 emits light during active periods, in between idle periods during which no light is emitted.

In procedure 224, the surface is scanned line by line, each line scanned during a scan cycle, acquiring a first group of at least one lit scan line during each of the active periods, and a second group of at least one unlit scan line during each of the idle periods. With reference to FIG. 1, line detector 102 scans the area defined by the gap in conveyor belt 112 line by line, acquiring a series of scan lines. Each scan line is acquired during a scan cycle. The active periods and idle periods of light source 104 are synchronized with the scan cycles of line detector 102. Line detector 102 acquires a first group of lit scan lines during each of the active periods and a second group of unlit scan lines during each of the idle periods. For example, scan line 114 is acquired during an active period, scan line 116 is acquired during the subsequent idle period, and scan line 118 is acquired during the subsequent active period. Referring to FIG. 4, line detector 102 acquires two lit scan lines during each active period, and acquires three unlit scan lines during each idle period.

In procedure 226, for each of a first group and a successive second group, a token pattern consisting of a lit segment of the first group adjoining an unlit segment of the second group, is identified. With reference to FIGS. 1, 3 and 4, processor 106 identifies a token pattern in the image received from line detector 102. Token pattern 154 (FIG. 3) includes an unlit pixel of a first unlit scan line, adjoining a lit pixel of the lit scan line directly following the first unlit scan line. Token pattern 182 (FIG. 4) includes an unlit segment of three unlit pixels of a first group of three unlit scan lines, adjoining a lit segment of two lit pixels of the successive group of two lit scan lines directly following the first group of unlit scan lines.

In procedure 228, for each of the first group and successive second group, the location where the token pattern ends or reappears is searched for, thereby defining edges of the object. With reference to FIGS. 1 and 3, processor 106 searches for the token pattern along each pair of a first group of lit scan lines and a successive second group of unlit scan lines. Processor 106 searches along unlit scan line 168 and the successive lit scan line 170 for the location where token pattern 154 ends. Processor 106 establishes that token pattern 154 ends at location 156 along scan lines 168 and 170. Processor 106 defines a first edge of preformed package 110B at location 156. Processor 106 continues to search along scan lines 168 and 170 from location 156 in the same direction as previously, for the location where token pattern 154 reappears. Processor 106 establishes that token pattern 154 reappears at location 158 along scan lines 168 and 170. Processor 106 defines another edge of preformed package 110B at location 158.

In procedure 230, the collection of defined edges is combined to produce an overall contour of the object. With reference to FIGS. 1 and 3, once processor 106 encounters another pair of scan line groups where the token pattern continues along the entire length of the scan line groups, processor 106 combines the collection of defined edges, to produce an overall contour of preformed package 110B.

Figure 7:
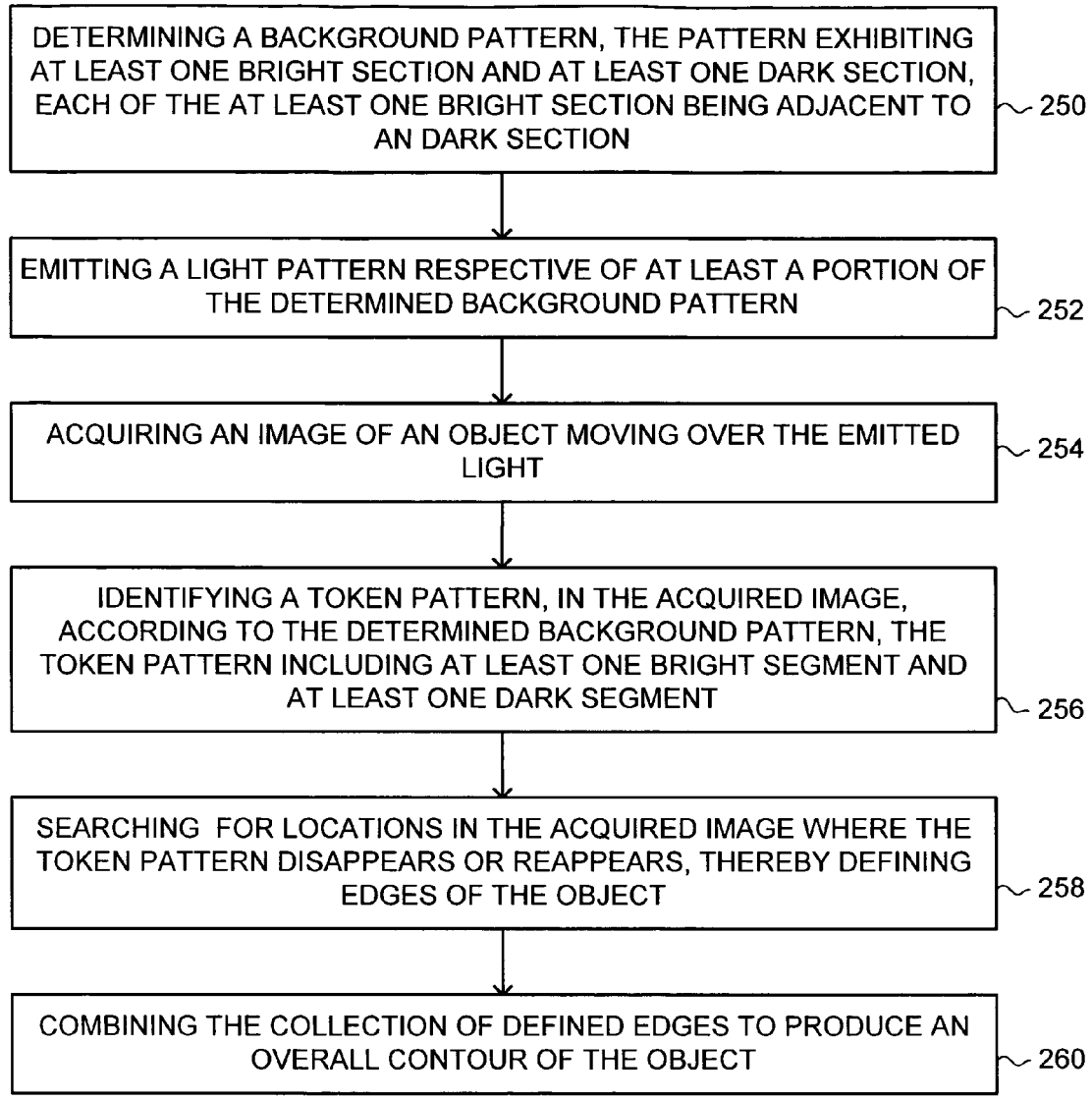
FIG. 7 is a schematic illustration of a method for detecting the contour of a moving object operative in accordance with another embodiment of the disclosed technique.

As mentioned above, the light projected by each pixel of light source is projected toward a respective pixel in the detector. Thus, the background pattern may be created by lighting appropriate object pixels of light source 104 at each scan line. Reference is now made to FIG. 7, which is a schematic illustration of a method for detecting the contour of a moving object, operative in accordance with another embodiment of the disclosed technique.

In procedure 250, a background pattern is determined. The pattern exhibits at least one bright section and at least one dark section. Each of the at least one bright section is adjacent to a dark section. The background pattern exhibits, for example, the form of a chess board. As another example, the background pattern exhibits the form of diagonal lines. As mentioned above, In general, the background pattern may be determined to exhibit a pattern that is substantially different from the general pattern printed on the moving objects (e.g., the direction of the majority of the lines of the printed pattern).

In procedure 252, a light pattern, respective of at least a portion of the determined background pattern, is emitted. Furthermore, the wavelength of the emitted light may be selected to be substantially different to the general wavelength of the pattern printed on the moving object (e.g., the average wavelength of the printed pattern). With reference to FIGS. 1 and 2, light source 104 projects light toward line detector 102. Object pixels $104_1$-$104_{16}$ direct light toward a respective pixel in line detector 102. The light emitted by object pixels $104_1$-$104_{16}$ forms at least a portion of the determined background pattern. For example, when the determined background pattern exhibits the form of a chess board, thus, object pixels $104_1$-$104_{16}$ are alternately bright and dark during a scan line. Object pixels $104_1$-$104_{16}$ are alternately dark and bright during the next scan line. Furthermore, the wavelength of the light emitted by object pixels $104_1$-$104_{16}$ is substantially different to the general wavelength of the pattern printed on the moving object.

In procedure 254 an image of an object moving over the emitted light is acquired. With reference to FIG. 1, line detector 102 acquires an image of the moving object by scanning the area defined by the gap in conveyor belt 112 line by line. Each scan line is acquired during a scan cycle.

In procedure 256, a token pattern is identified, in the acquired image, according to the determined background pattern. The token pattern includes at least one bright segment and at least one dark segment. For example, in case the background pattern exhibits the form of a chess board, the token pattern will include four pixels arranged in a square where two diagonal pixels are bright and the other two pixels are dark. With reference to FIG. 1, processor 106 identifies the token pattern in the image received from line detector 102.

In procedure 258 locations are searched in the acquired image, where the token pattern disappears or reappears. Thereby edges of the moving object are defined. With reference to FIG. 1, processor 106 searches for the token pattern along groups of scan lines.

In procedure 260, a collection of defined edges are collected to produce an overall contour of the object. Processor 106 combines the collection of defined edges, to produce an overall contour of preformed package 1106.

It will be appreciated by persons skilled in the art that the disclosed technique is not limited to what has been particularly shown and described hereinabove. Rather the scope of the disclosed technique is defined only by the claims, which follow.

The invention claimed is:

1. A system for detecting the contour of an object situated on a surface, the system comprising:
    (a) an image acquisition assembly, wherein there is relative motion between said image acquisition assembly and said object, said image acquisition assembly comprising:
        (1) a line detector, operable for scanning said surface line by line by virtue of said relative motion, wherein each line is scanned during a scan cycle, said line being transverse to the direction of said relative motion; and
        (2) a light source, operable for emitting light toward said line detector during active periods between idle periods, such that during each of said active periods said light is emitted for at least one cycle synchronized with said scan cycle, allowing said line detector to acquire a first group of at least one lit scan line, and during each of said idle periods lasting for at least another cycle synchronized with said scan cycle, no light is emitted, allowing said line detector to acquire a second group of at least one unlit scan line, wherein said object passes between said line detector and said light source by virtue of said relative motion, and
    (b) a processor coupled with said image acquisition assembly, said processor receiving and analyzing scan lines acquired by said line detector, wherein for each of said first group of at least one lit scan line and a successive one of said second group of at least one unlit scan line, said processor identifies a token pattern consisting of a lit segment of said first group adjoining an unlit segment of said second group, said processor searches along said first group and said successive second group for locations where said token pattern ends or reappears, thereby defining edges of said object, and combining the collection of said defined edges to produce a contour of said object.

2. The system according to claim 1, wherein said surface is a conveyor belt.

3. The system according to claim 2, wherein said conveyor belt is moving and said image acquisition assembly is stationary.

4. The system according to claim 2, wherein said conveyor belt is stationary and said image acquisition assembly is moving.

5. The system according to claim 2, wherein said conveyor belt is moving in one direction and said image acquisition assembly is moving in an opposite direction.

6. The system according to claim 1, wherein said line detector is a line scan camera.

7. The system according to claim 1, wherein said line detector is a charge-coupled device (CCD) array.

8. The system according to claim 1, wherein said light source is an array of light emitting diodes (LEDs).

9. The system according to claim 1, further comprising a speed monitoring device, measuring the speed at which said conveyor belt is moving, and providing said speed to said processor.

10. The system according to claim 9, wherein said speed monitoring device is a tachometer.

11. The system according to claim 1, wherein said object is three-dimensional.

12. The system according to claim 1, wherein each of said active periods lasts for the entire duration of said scan cycle.

13. The system according to claim 1, wherein the shape of said line detector is selected from the group consisting of:
    straight;
    curved;
    rounded;
    arched;
    wavy; and
    circular.

14. The system according to claim 1, wherein the shape of said light source is selected from the group consisting of:
    straight;
    curved;
    rounded;
    arched;
    wavy; and
    circular.

15. The system according to claim 1, wherein said line detector scans said surface in a non-straight pattern.

16. The system according to claim 1, wherein said surface is transparent.

17. The system according to claim 1, further including at least one further image acquisition assembly.

18. A method for detecting the contour of an object situated on a surface, the method comprising the procedures of:
    emitting light from a light source toward a scanning means during active periods between idle periods, wherein said object passes between said scanning means and said light source by virtue of relative motion between said object and said scanning means;
    scanning said surface line by line by said scanning means by virtue of said relative motion, each line scanned during a scan cycle, allowing said scanning means to acquire a first group of at least one lit scan line during each of said active periods, and to acquire a second group of at least one unlit scan line during each of said idle periods, wherein during each of said active periods said light is emitted for at least one cycle synchronized with said scan cycle, and during each of said idle periods lasting for at least another cycle synchronized with said scan cycle, no light is emitted;
    for each of said first group and a successive one of said second group, identifying a token pattern consisting of a lit segment of said first group adjoining an unlit segment of said second group;
    for each of said first group and said successive second group, searching for the location where said token pattern ends or reappears, thereby defining edges of said object; and
    combining the collection of said defined edges to produce a contour of said object.

19. The method according to claim 18, wherein said surface is a conveyor belt.

20. The method according to claim 18, wherein each of said active periods lasts for the entire duration of said scan cycle.

* * * * *